(12) United States Patent
Yi et al.

(10) Patent No.: US 8,774,108 B2
(45) Date of Patent: Jul. 8, 2014

(54) METHOD OF RELEASING RADIO BEARER IN WIRELESS COMMUNICATION SYSTEM AND RECEIVER

(75) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 694 days.

(21) Appl. No.: 12/646,611

(22) Filed: Dec. 23, 2009

(65) Prior Publication Data

US 2010/0165937 A1    Jul. 1, 2010

Related U.S. Application Data (60) Provisional application No. 61/140,904, filed on Dec. 26, 2008, provisional application No. 61/142,257, filed on Jan. 2, 2009.

(30) Foreign Application Priority Data

Oct. 9, 2009    (KR) .................. 10-2009-0095995

(51) Int. Cl.
  *H04W 4/00*    (2009.01)
(52) U.S. Cl.
  USPC ........... 370/329; 370/312; 370/331; 370/466; 455/428; 455/436
(58) Field of Classification Search
  None
  See application file for complete search history.

(56) References Cited

U.S. PATENT DOCUMENTS

| | | | |
|---|---|---|---|
| 2002/0094814 A1* | 7/2002 | Wigell et al. | 455/436 |
| 2004/0033801 A1* | 2/2004 | Yi et al. | 455/428 |
| 2005/0174956 A1* | 8/2005 | Yi et al. | 370/312 |
| 2006/0077993 A1* | 4/2006 | Pereira et al. | 370/412 |
| 2007/0291788 A1* | 12/2007 | Sammour et al. | 370/466 |
| 2008/0020757 A1* | 1/2008 | Hans et al. | 455/432.2 |
| 2008/0095116 A1* | 4/2008 | Kim et al. | 370/331 |
| 2008/0225843 A1* | 9/2008 | Sivakumar | 370/389 |
| 2009/0168723 A1* | 7/2009 | Meylan | 370/331 |

FOREIGN PATENT DOCUMENTS

| | | |
|---|---|---|
| KR | 10-2007-0038425 | 4/2007 |
| KR | 10-2007-0073577 | 7/2007 |
| KR | 10-2007-0095755 | 10/2007 |

* cited by examiner

*Primary Examiner* — Ayaz Sheikh
*Assistant Examiner* — Hai-Chang Hsiung
(74) *Attorney, Agent, or Firm* — Lee, Hong, Degerman, Kang & Waimey

(57) ABSTRACT

A method and apparatus of releasing a radio bearer in a wireless communication system is provided. After determining to release a radio link control (RLC) entity and a packet data convergence protocol (PDCP) entity, the RLC entity is released after delivering an RLC service data unit (SDU) extracted according to a release request of the RLC entity to the PDCP entity. A first PDCP SDU obtained by processing the RLC SDU is stored in a reception buffer at the PDCP entity. The PDCP entity is released after delivering the first PDCP SDU stored in the reception buffer to a higher layer.

2 Claims, 8 Drawing Sheets

METHOD OF RELEASING RADIO BEARER IN WIRELESS COMMUNICATION SYSTEM AND RECEIVER

CROSS-REFERENCE TO RELATED APPLICATIONS

This application claims the benefit of priority of U.S. Provisional application No. 61/140,904 filed on Dec. 26, 2008, U.S. Provisional application No. 61/142,257 filed on Jan. 2, 2009, and Korean Patent Application No. 10-2009-0095995 filed on Oct. 9, 2009, all of which are incorporated by reference in their entirety herein.

BACKGROUND OF THE INVENTION

1. Field of the Invention

The present invention relates to wireless communications, and more particularly, to a method and apparatus for releasing a radio bearer in a wireless communication system.

2. Related Art

Wireless communication systems are widely used to provide a voice service or a packet service. A multiple access system supports multi-user communication by sharing available system resources. Examples of the multiple access system include a code division multiple access (CDMA) system, a frequency division multiple access (FDMA) system, a time division multiple access (TDMA) system, an orthogonal frequency division multiple access (OFDMA) system, etc.

3-rd generation partnership project (3GPP) release 8 introduces 3GPP long term evolution (LTE) that is an evolution of a universal mobile telecommunication system (UMTS). The 3GPP LTE uses OFDMA in a downlink, and uses single carrier-FDMA (SC-FDMA) in an uplink. The 3GPP LTE employs multiple input multiple output (MIMO) having 4 antennas. In recent years, there is an ongoing discussion on 3GPP LTE-advanced (LTE-A) that is an evolution of the 3GPP LTE.

A radio bearer is a logical path for data transmission between a user and a network. The radio bearer can be created, re-established, and released anytime at the request of the user or the network. In general, when the radio bearer is released, entire data stored in a buffer of each layer is directly discarded without performing any process on the data.

However, if the entire data is directly discarded when the radio bearer is released, it may cause ineffective use of resources. This is because, when successfully received data is discarded due to the release of the radio bearer, the data may be redundantly transmitted again thereafter.

SUMMARY OF THE INVENTION

The present invention provides a method of releasing a radio bearer to avoid a loss of data stored in a buffer, and a receiver.

In an aspect, a method of releasing a radio bearer in a wireless communication system is provided. The method includes determining to release a radio link control (RLC) entity and a packet data convergence protocol (PDCP) entity, releasing the RLC entity after delivering an RLC service data unit (SDU) extracted according to a release request of the RLC entity to the PDCP entity, storing a first PDCP SDU obtained by processing the RLC SDU in a reception buffer at the PDCP entity, and releasing the PDCP entity after delivering the first PDCP SDU stored in the reception buffer to a higher layer.

The method may further include delivering a second PDCP SDU previously stored in the reception buffer to the higher layer.

The plurality of PDCP SDUs stored in the reception buffer may be delivered to the higher layer in an ascending order of a sequence number (SN) of each PDCP SDU.

The plurality of PDCP SDUs stored in the reception buffer may be all PDCP SDUs stored in the reception buffer.

The PDCP entity may obtain the first PDCP SDU by performing deciphering and header decompression on the RLC SDU.

The RLC SDU may be obtained by reassembling at least one RLC protocol data unit (PDU) received from a transmitter.

The number of RLC SDUs delivered to the PDCP entity may be a plural number, and the plurality of RLC SDUs may be delivered to the PDCP entity in an ascending order of an SN of each RLC SDU.

In another aspect, a receiver includes a radio frequency (RF) unit, and a processor, operatively coupled to the RF unit, for releasing a radio bearer, and configured to determine to release a radio link control (RLC) entity and a packet data convergence protocol (PDCP) entity, release the RLC entity after delivering an RLC service data unit (SDU) extracted according to a release request of the RLC entity to the PDCP entity, store a first PDCP SDU obtained by processing the RLC SDU in a reception buffer at the PDCP entity, and release the PDCP entity after delivering the first PDCP SDU stored in the reception buffer to a higher layer.

A radio resource can be effectively utilized by avoiding redundant data transmission. In addition, a loss of data blocks discontinuously received can be prevented.

DESCRIPTION OF EXEMPLARY EMBODIMENTS

Figure 1:
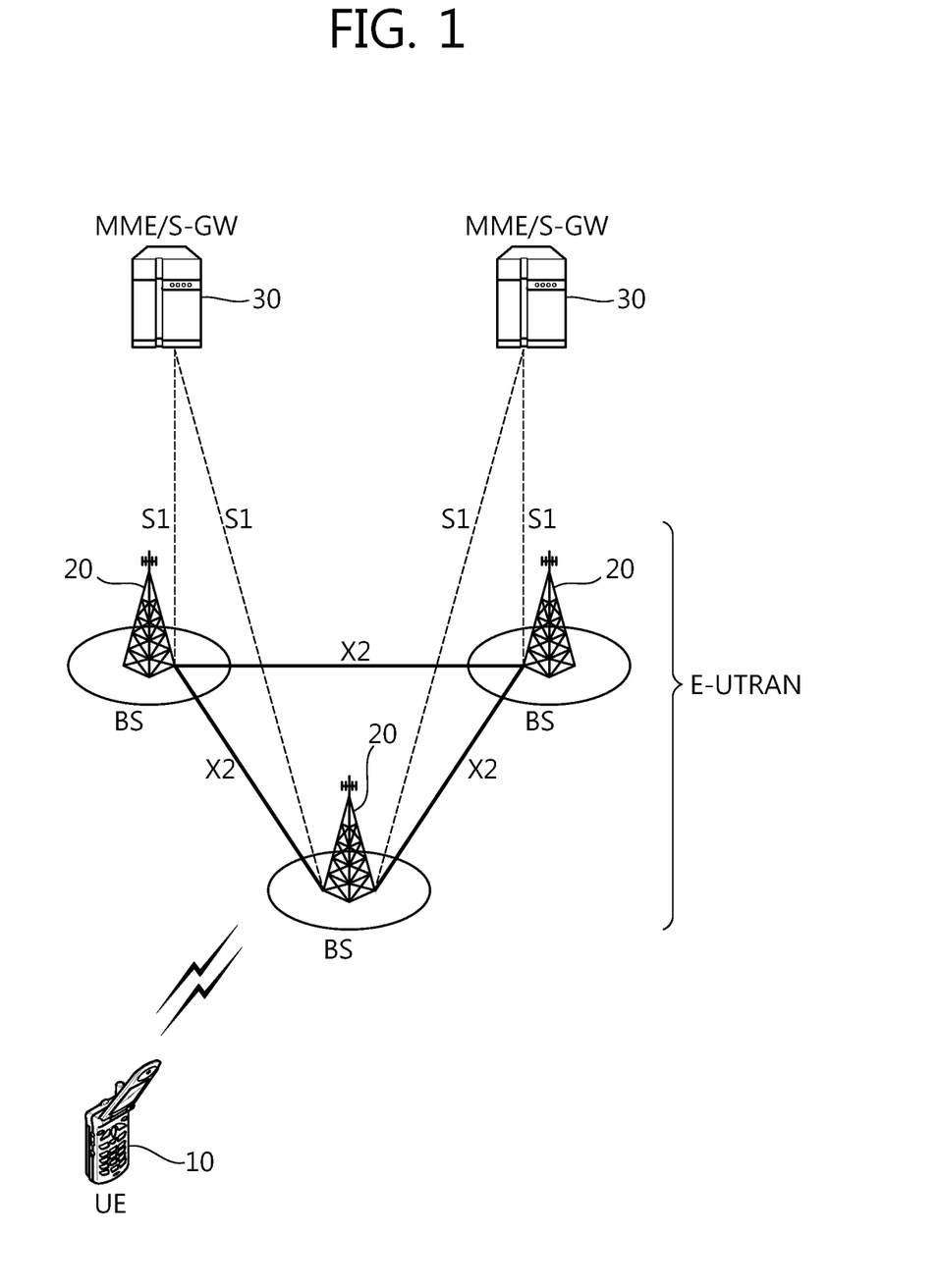
FIG. 1 shows a structure of a wireless communication system.

FIG. 1 is a block diagram showing a wireless communication system. This may be a network structure of a 3rd generation partnership project (3GPP) long term evolution (LTE)/ LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
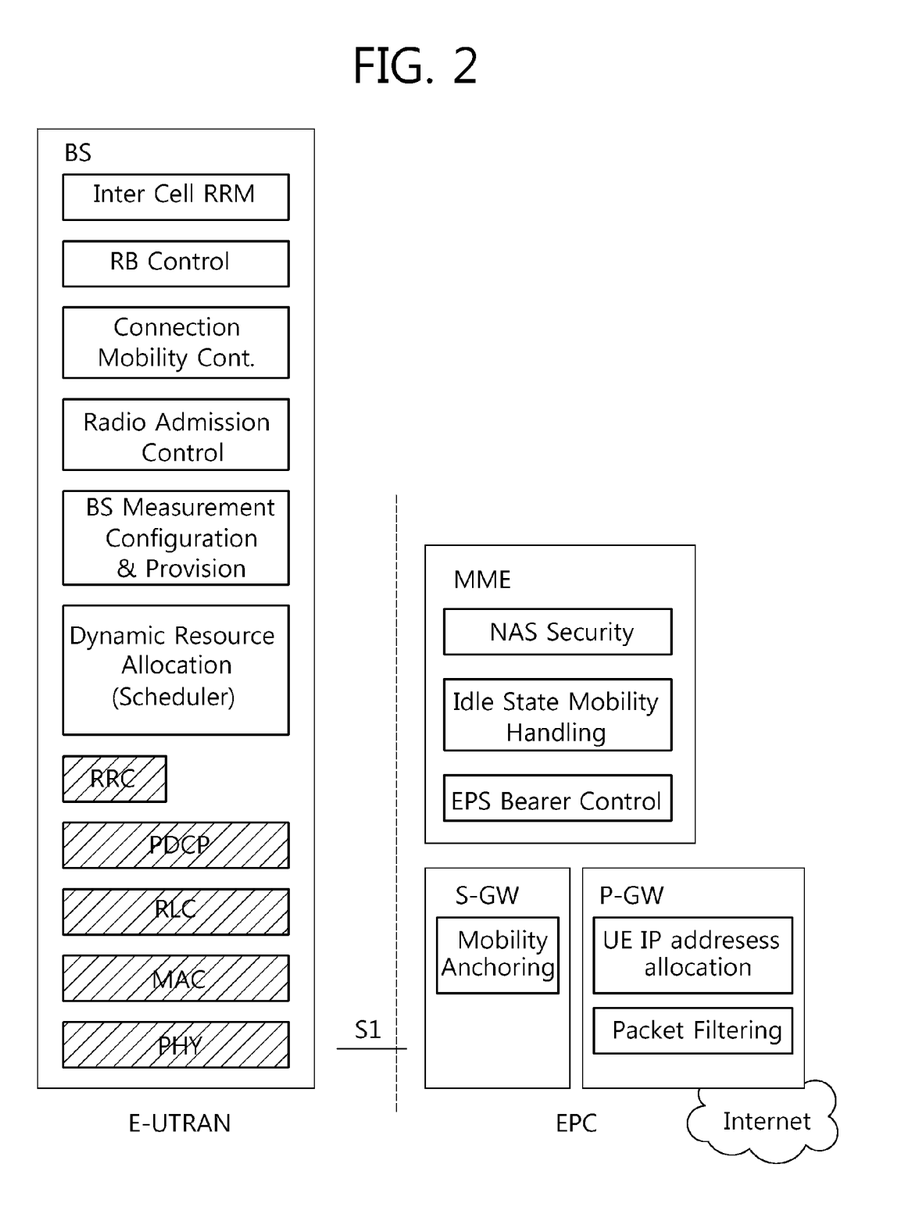
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane. ABS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (internet protocol) allocation and (2) packet filtering.

Figure 3:
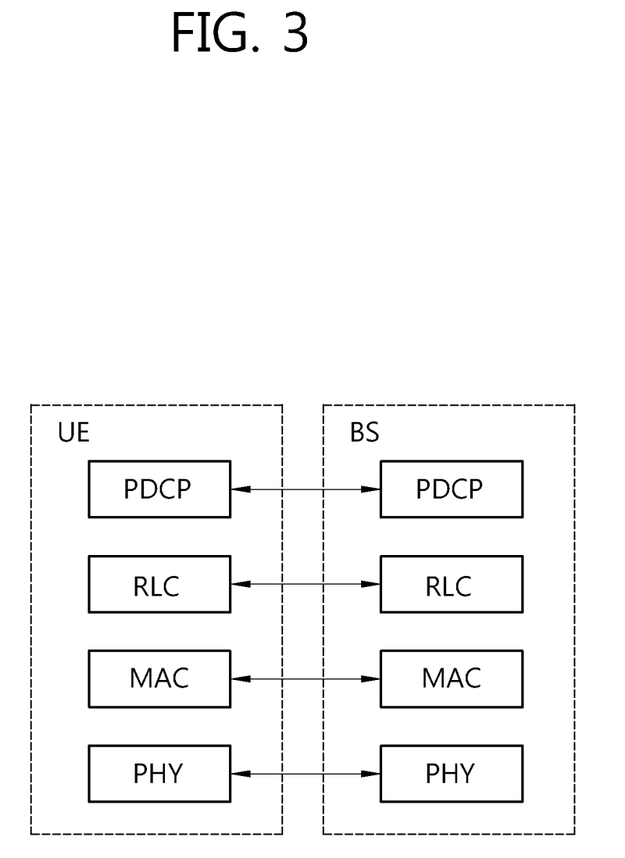
FIG. 3 is a diagram showing a radio protocol architecture for a user plane.
Figure 4:
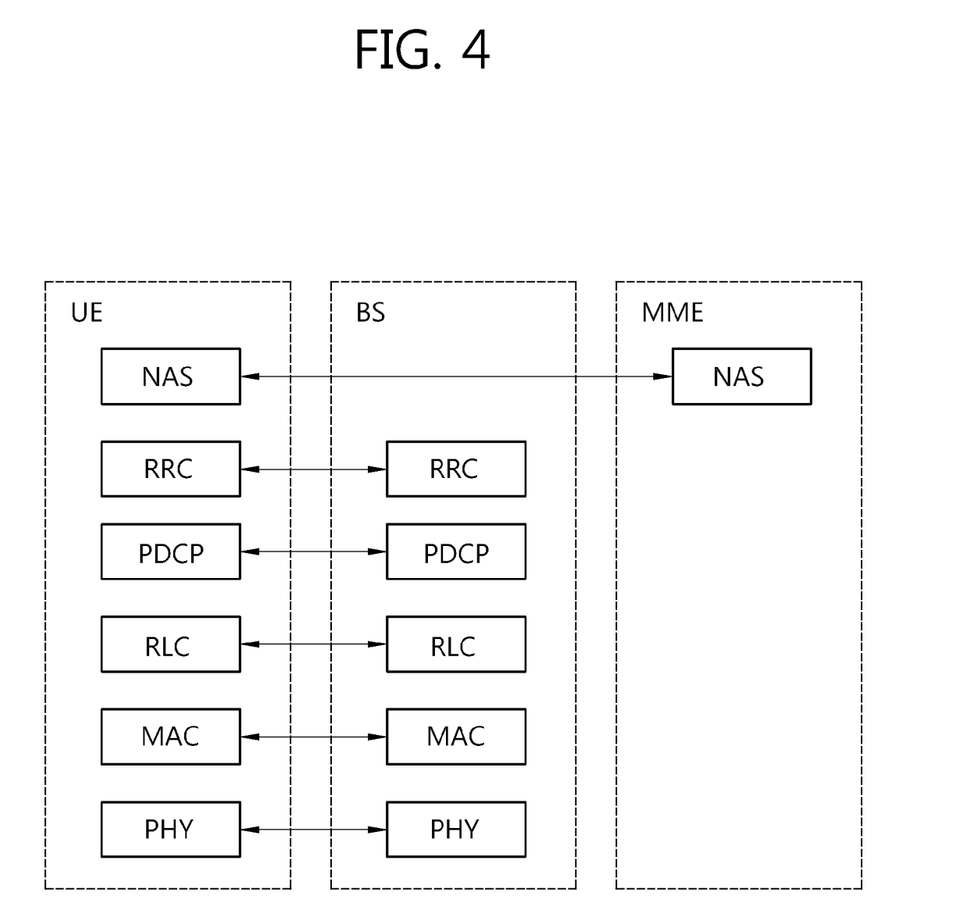
FIG. 4 is a diagram showing a radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface. Between different physical layers, i.e., the physical layer of a transmitter and the physical layer of a receiver, data are transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

A RRC (Radio Resource Control) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
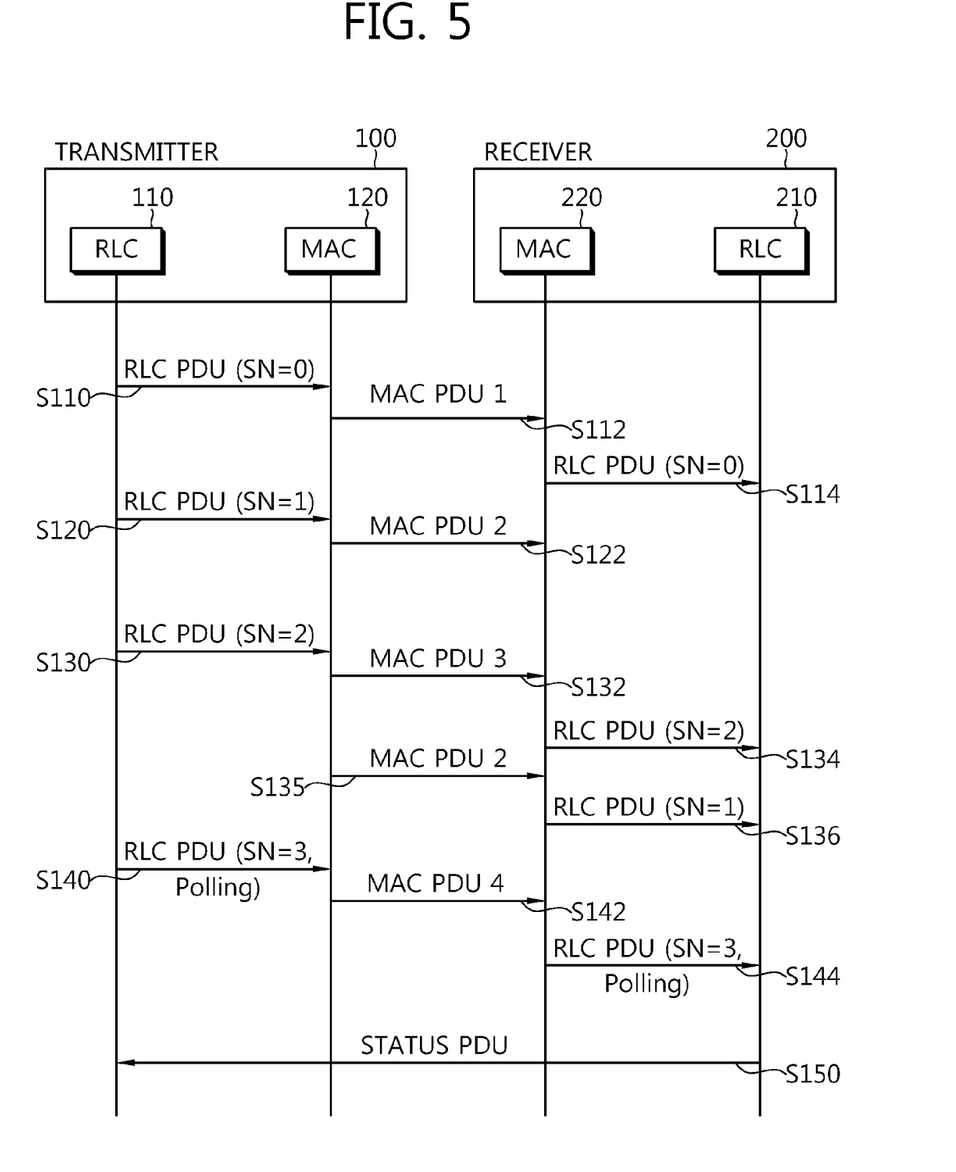
FIG. 5 is a flow diagram showing hybrid automatic repeat request (HARQ) and automatic repeat request (ARQ).

FIG. 5 is a flow diagram showing hybrid automatic repeat request (HARM) and automatic repeat request (ARQ). An RLC entity 110 of a transmitter 100 transmits an RLC protocol data unit (PDU) with a sequence number (SN) of 0 to a MAC entity 120 (step S110). The MAC entity 120 of the transmitter 100 transmits a MAC PDU1(s) corresponding to the RLC PDU with SN=0 to a MAC entity 220 of a receiver 200 (step S112). Upon successfully receiving the MAC PDU, the MAC entity 220 transmits the RLC PDU with SN=0 to an RLC entity 210 (step S114).

The RLC entity 110 of the transmitter 100 transmits an RLC PDU with SN=1 to the MAC entity 120 (step S120). The MAC entity 120 of the transmitter 100 transmits a MAC PDU2(s) corresponding to the RLC PDU with SN=1 to the MAC entity 220 of the receiver 200 (step S122). It is assumed that a radio channel deteriorates and thus HARQ is performed on the MAC PDU2.

The RLC entity 110 of the transmitter 100 transmits an RLC PDU with SN=2 to the MAC entity 120 (step S130). The MAC entity 120 of the transmitter 100 transmits a MAC PDU3(s) corresponding to the RLC PDU with SN=2 to the MAC entity 220 of the receiver 200 (step S132). Upon successfully receiving the MAC PDU3, the MAC entity 220 transmits the RLC PDU with SN=2 to the RLC entity 210 (step S134).

An HARQ process performed on the MAC PDU2(s) corresponding to the RLC PDU with SN=1 is complete (step S135), and the RLC entity 210 obtains the RLC PDU with SN=1 (step S136). According to the HARQ process, SNs of RLC PDUs received by the RLC entity 210 may not be continuous. This is referred to as HARQ reordering.

The RLC entity 110 of the transmitter 100 transmits an RLC PDU with SN=3 to the MAC entity 120 (step S140). In this case, a polling bit is set in a header of the RLC PDU, and a status report is requested. The MAC entity 120 of the transmitter 100 transmits a MAC PDU4(s) corresponding to the RLC PDU with SN=3 to the MAC entity 220 of the receiver 200 (step S142). Upon successfully receiving the MAC PDU4, the MAC entity 220 transmits the RLC PDU with SN=3 to the RLC entity 210 (step S144). When the status report is requested, the RLC entity 210 constructs a status PDU and transmits the status PDU to the RLC entity 110 of the transmitter 100 (step S150).

A PDU is a data block transmitted by a certain layer to a lower layer. An SDU is a data block received by a certain layer from a higher layer. For example, an RLC PDU is a data block transmitted by an RLC to a MAC, and an RLC SDU is a data block received by the RLC from a PDCP. Conversion from the PDU to the SDU or conversion from the SDU to the PDU may differ depending on functions of the layers.

An RLC entity supporting ARQ is referred to as an acknowledged mode (AM) RLC entity. An RLC entity not supporting ARQ is referred to as an unacknowledged mode (UM) RLC entity.

The UM RLC entity constructs each PDU having a header including a sequence number (SN) to allow the UM RLC entity of the receiver to be able to know which PDU is lost in transmission. In the UM RLC, a user plane handles broadcast/multicast data transmission or real-time packet data transmission, such as voice (e.g., voice over Internet protocol (VoIP)) or streaming in a packet service domain, and a control plane handles transmission of an RRC message which does not require a reception acknowledgement among RRC messages transmitted to a specific UE or a specific UE group in a cell.

After receiving a PDU, the UM RLC entity of the receiver first examines an SN of the PDU. If the received PDU is an in-sequence PDU with respect to a previously received PDU, an SDU obtained by processing the PDU is delivered to a higher layer (e.g., PDCP). Otherwise, if the received PDU is an out-of-sequence PDU, the PDU is stored in a buffer. The PDU waits in the buffer until the in-sequence PDU is received.

The RLC entity receives a PDU out of sequence for the following two reasons. A first reason is that the PDU is lost in transmission, and a second reason is that HARQ reordering occurs in a lower layer. When out-of-sequence reception occurs due to the PDU loss as described in the first reason, the UM RLC entity of the receiver preferably transmits a PDU received out of sequence to the higher layer as soon as possible. When out-of-sequence reception occurs due to the HARQ reordering as described in the second reason, an in-sequence PDU is received after a specific time elapses. Thus, the UM RLC of the receiver preferably waits until the specific time elapses, and then receives PDUs in sequence and processes the received PDUs.

A timer is defined by the UM RLC entity of the receiver to deal with the aforementioned both problematic cases of receiving the PDU out of sequence. When a certain PDU is received out of sequence, the PDU is stored in a buffer and the timer is started at the same time. If an in-sequence PDU is not received until the timer expires, it is determined that out-of-sequence reception occurs due to a PDU loss. That is, when the certain PDU is received out of sequence, the PDU waits in the buffer until the timer expires or until a previous in-sequence PDU is received.

Similarly to the UM RLC entity, the AM RLC entity also constructs a PDU with a header including an SN. However, the AM RLC entity differs from the UL RLC entity in that the AM RLC entity transmits an acknowledgment to the transmitter in response to the received PDU. The acknowledgment is used to request the transmitter to retransmit a PDU that fails to be received by the receiver. The AM RLC is used for the purpose of guaranteeing error-free data transmission by performing retransmission. In the AM RLC, a user plane handles non-real-time packet data transmission such as transmission control protocol/Internet protocol (TCP/IP) in a packet service domain, and a control plane handles transmission of an RRC message that requires a reception acknowledgment among RRC messages transmitted to a specific UE in a cell.

Upon receiving a PDU, the AM RLC entity also first examines an SN of the PDU, which is the same as in the UM RLC entity. If the received PDU is an in-sequence PDU with respect to a previously received PDU, an SDU obtained by processing the PDU is delivered to a higher layer. Otherwise, if the received PDU is an out-of-sequence PDU, the PDU is stored in a buffer. The PDU waits in the buffer until the in-sequence PDU is received.

The AM RLC receives a PDU out of sequence for the same reason as in the UM RLC. However, since the AM RLC supports retransmission, the PDU received out of sequence is not delivered when the timer expires. Instead, a status report is transmitted to the AM RLC of the transmitter to request retransmission of an unsuccessfully received PDU. Therefore, in the AM RLC entity, if a certain PDU is received out of sequence, the receive PDU waits in a buffer until a previous in-sequence PDU is received.

A PDCP layer receives a PDCP PDU delivered from an RLC layer that is a lower layer of the PDCP layer. Then, the PDCP layer performs deciphering and header decompression on the PDCP PDU, and delivers a decompressed PDCP SDU to a higher layer. In general, a case where the PDCP SDU waits in a buffer of the PDCP layer does not occur. This is because an UM RLC or an AM RLC which is a lower layer of the PDCP layer always delivers the PDCP PDU in an ascending order of an SN, and thus the PDCP delivers the received PDCP PDU to the higher layer by processing the PDCP PDU in order.

A radio bearer (RB) is a path for data transmission, and can be created and released anytime at the request of a UE or a network. However, as described above, PDUs or SDUs may be stored in the RLC buffer and/or the PDCP buffer due to out-of-sequence reception such as HARQ reordering. In this case, if data stored in the RLC buffer and/or the PDCP buffer is directly discarded when the RB is released, it may cause ineffective resource utilization.

Therefore, in a method described below, data stored in a buffer can be processed when an RB is released so that a data loss is minimized even when the RB is released.

Figure 6:
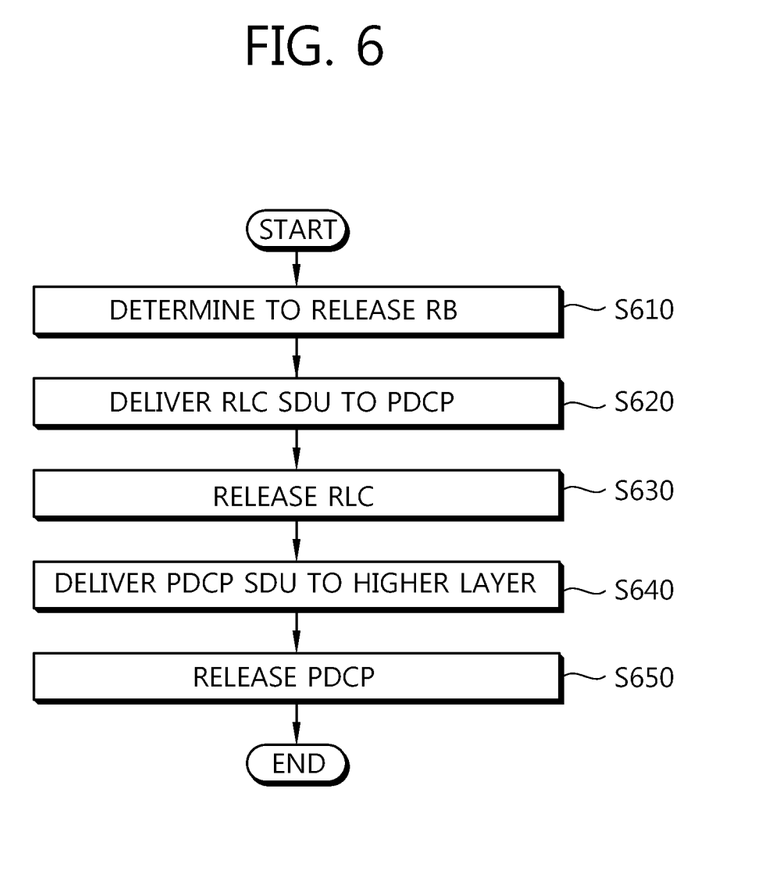
FIG. 6 is a flowchart showing an example of releasing a radio bearer.

FIG. 6 is a flowchart showing an example of releasing a radio bearer (RB). This method can be performed by a processor of a receiver.

In step S610, the receiver determines to release the RB. An RRC transmits a release request of the RB to an RLC and a PDCP to request release of the RLC and the PDCP. The RLC may be a UM RLC or an AM RLC.

In step S620, the RLC of the receiver obtains an RLC SDU by reassembling the RLC PDU stored in an RLC reception buffer, and delivers the reassembled RLC SDU to the PDCP. The RLC of the receiver removes a header from an RLC PDU (e.g., a UMD PDU, an AMD PDU, and/or an AMD PDU segment) which is successfully received and which is stored in the RLC reception buffer, and reassembles the RLC PDU, thereby obtaining a complete RLC SDU. If the obtained RLC SDU is incomplete due to a lost PDU, the incomplete RLC SDU is discarded. The reassembled RLC SDU is delivered to the PDCP. The delivered RLC SDU corresponds to the PDCP PDU. The reassembled RLC SDU may be delivered to the PDCP in an ascending order of an SN.

In step S630, the RLC SDU is delivered to the PDCP, and thereafter the RLC is released.

In step S640, the PDCP of the receiver obtains a PDCP SDU by processing a PDCP PDU stored in the PDCP reception buffer and/or a PDCP PDU delivered from the RLC, and thereafter delivers the obtained PDCP SDU to a higher layer. The PDCP obtains a complete PDCP SDU by performing deciphering and header decompression on the PDCP PDU stored in the PDCP reception buffer and the PDCP PDU delivered from the RLC, and then stores the obtained PDCP SDU in the PDCP reception buffer. All completed PDCP SDUs stored in the PDCP reception buffer are delivered to the higher layer of the PDCP. The higher layer of the PDCP may be an application layer or the like which can receive and process the PDCP SDU. The PDCP SDU may be delivered to the higher layer in an ascending order of an SN.

In step S650, the PDCP SDU is delivered to the higher layer, and thereafter the PDCP is released.

The RB may be released in an abnormal situation. For example, this is a case where a channel state between a UE and a network temporarily deteriorates or a radio resource is temporarily insufficient. By allowing previously received data to be delivered to the higher layer when the RB is released, the previous data can be maintained and a data loss can be prevented when the RB is reestablished.

Although release of the RLC and the PDCP is described herein, the technical features of the present invention may also apply when release is performed for at least two layers. For example, in the above description, under the assumption that a first layer is the RLC layer and a second layer is the PDCP layer, a data block is delivered when these two layers are released. The technical features of the present invention can also apply when release is performed for layers constituting another radio interface protocol.

Figure 7:
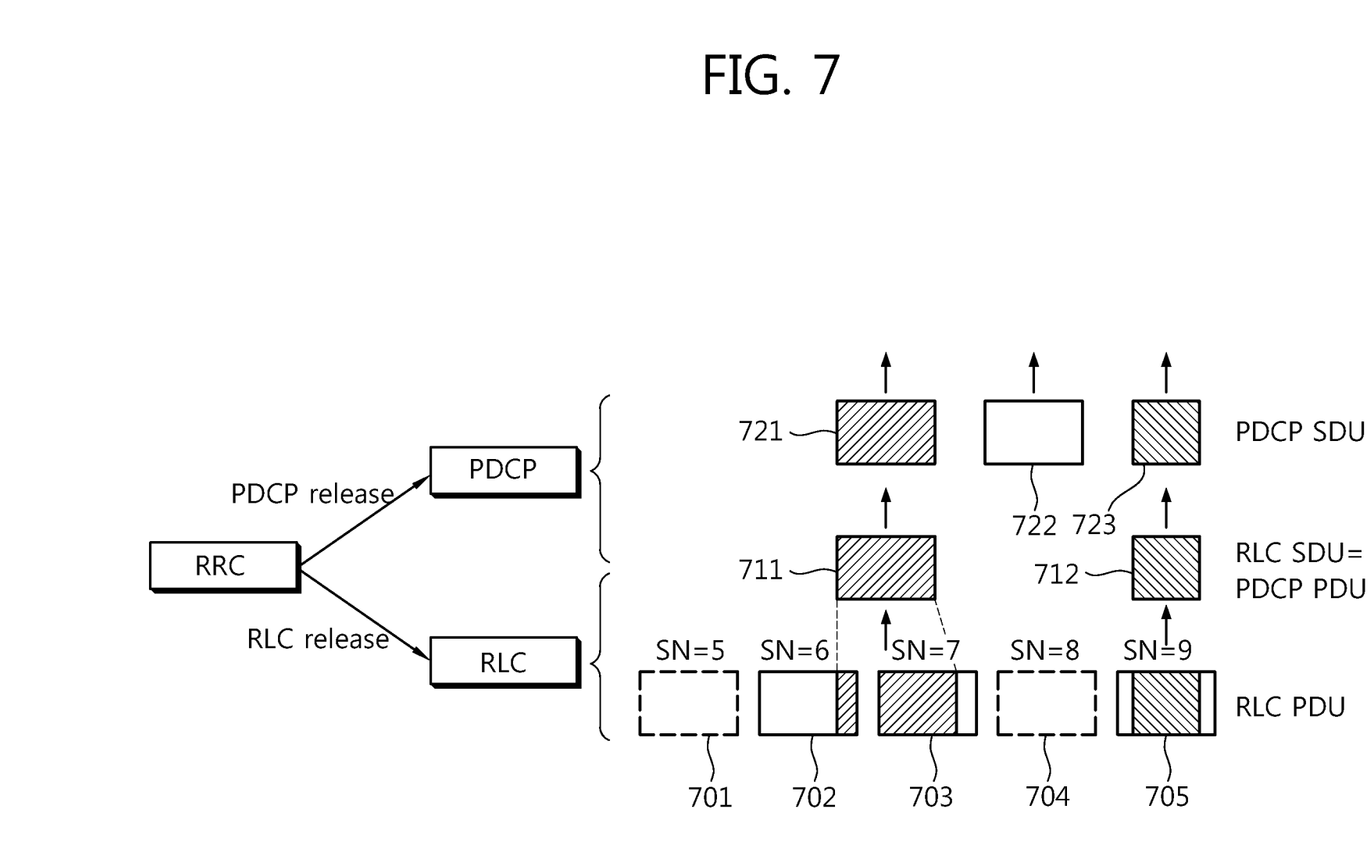
FIG. 7 is a conceptual diagram showing a process of releasing a radio bearer.

FIG. 7 is a conceptual diagram showing a process of releasing an RB. An RRC transmits a release request to an RLC and a PDCP to release the RB. In the RLC, an RLC PDU 702 with SN=6, an RLC PDU 703 with SN=7, and an RLC PDU 705 with SN=9 are stored in an RLC reception buffer, and an RLC PDU 701 with SN=5 and an RLC PDU 704 with SN=8 wait to be received. In response to the RLC release request, the RLC extracts a first RLC SDU 711 from the RLC PDU 702 with SN=6 and the RLC PDU 703 with SN=7, and extracts a second RLC SDU 712 from the RLC PDU 705 with SN=9. The extracted first RLC SDU 711 and the extracted second RLC SDU 712 are delivered to the PDCP, and thereafter the RLC is released.

The first RLC SDU 711 and second RLC SDU 712 delivered to the PDCP become a first PDCP PDU and a second PDCP PDU, respectively. The PDCP obtains a first PDCP SDU 721 and a third PDCP SDU 723 by performing deciphering and header decompression on each of the first RLC SDU 711 and second RLC SDU 712 delivered from the RLC, and stores the obtained SDUs in a PDCP reception buffer. Further, the PDCP obtains a second PDCP SDU 722 from a PDCP PDU previously stored in the PDCP reception buffer, and stores the obtained SDU in the PDCP reception buffer. The first PDCP SDU 721, the second PDCP SDU 722, and the third PDCP SDU 723 are delivered to a higher layer of the PDCP, and thereafter the PDCP is released.

A radio resource can be effectively utilized by avoiding redundant data transmission. In addition, a loss of data blocks discontinuously received can be prevented.

Figure 8:
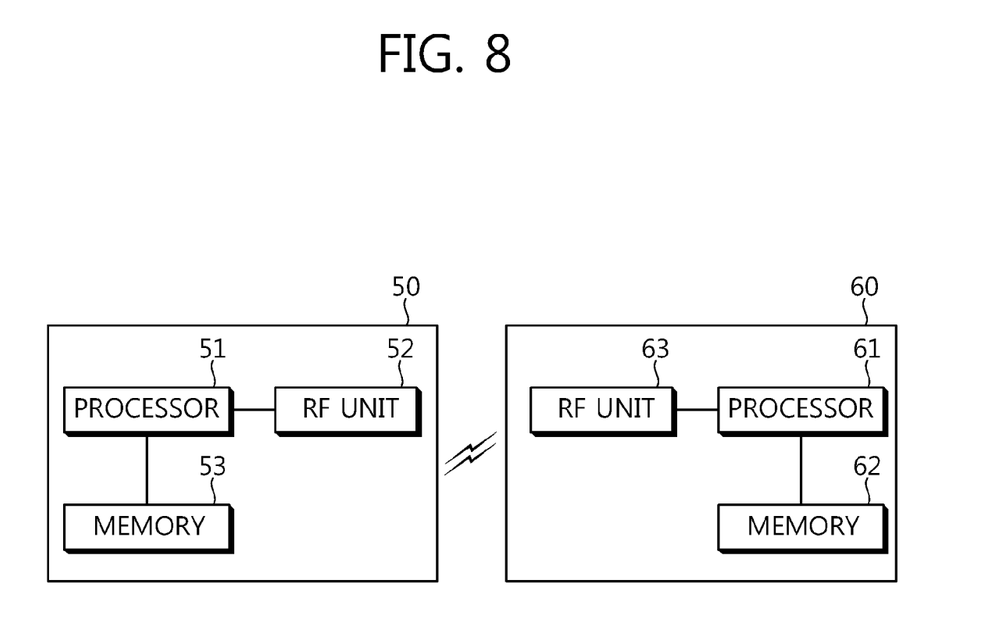
FIG. 8 is a block diagram showing wireless communication system to implement an embodiment of the present invention.

FIG. 8 is a block diagram showing wireless communication system to implement an embodiment of the present invention. A transmitter 50 and a receiver 60 may be a part of a user equipment, a base station or a relay station. A transmitter 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A receiver 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of releasing a radio bearer in a wireless communication system, the method comprising:
   transmitting, from a radio resource control (RRC) layer of a receiver, a radio link control (RLC) radio bearer release request to a radio link control (RLC) layer of the receiver;
   transmitting, from the RRC layer of the receiver, a packet data convergence protocol (PDCP) radio bearer release request to a PDCP layer of the receiver,
   wherein the RLC radio bearer release request and the PDCP radio bearer release request are transmitted in order to request a release of an RLC entity and a PDCP entity individually;
   delivering, from the RLC layer of the receiver, an RLC service data unit (SDU) to the PDCP layer of the receiver in ascending order by sequence number (SN) of each RLC SDU, the RLC SDU obtained by reassembling one or more RLC packet data units (PDUs) which is successfully received before the RLC radio bearer release request is transmitted and which is stored in an RLC reception buffer,
   wherein the delivered RLC SDU is a complete RLC SDU that is obtained by reassembling the one or more successfully received RLC PDUs and by removing a header from the RLC PDU that is stored in the RLC reception buffer;
   releasing, by the RLC layer of the receiver, the RLC entity after the complete RLC SDU is delivered to the PDCP layer of the receiver;
   delivering, from the PDCP layer of the receiver, a PDCP SDU to a higher layer in ascending order by sequence number (SN) of each PDCP SDU after the RLC entity is released, the PDCP SDU obtained by processing a PDCP PDU corresponding to the RLC SDU,
   wherein the delivered PDCP SDU is a complete PDCP SDU that is obtained by performing deciphering and header decompression on the PDCP PDU successfully received from the RLC layer before the PDCP radio bearer release request and previously stored one or more PDCP PDUs in a PDCP reception buffer; and
   releasing the PDCP entity after the complete PDCP SDU is delivered to the higher layer.

2. A receiver comprising:
   a radio frequency (RF) unit; and
   a processor, operatively coupled to the RF unit, for releasing a radio bearer, and configured to:
   transmit a radio link control (RLC) radio bearer release request from a radio resource controller (RRC) layer of the receiver to a radio link control (RLC) layer;
   transmit a packet data convergence protocol (PDCP) radio bearer release request from the RRC layer of the receiver to a PDCP layer of the receiver,
   wherein the RLC radio bearer release request and the PDCP radio bearer release request are transmitted in order to request a release of an RLC entity and a PDCP entity individually;
   deliver an RLC service data unit (SDU) from the RLC layer of the receiver to the PDCP layer of the receiver in ascending order by sequence number (SN) of each RLC SDU, the RLC SDU obtained by reassembling one or more RLC packet data units (PDUs) which is successfully received before the RLC radio bearer release request is transmitted and which is stored in an RLC reception buffer,
   wherein the delivered RLC SDU is a complete RLC SDU that is obtained by reassembling the one or more successfully received RLC PDUs and by removing a header from the RLC PDU that is stored in the RLC reception buffer;
   release an RLC entity after the complete RLC SDU is delivered to the PDCP layer of the receiver;
   deliver a PDCP SDU from the PDCP layer of the receiver to a higher layer in ascending order by sequence number (SN) of each PDCP SDU after the RLC entity is released, the PDCP SDU obtained by processing a PDCP PDU corresponding to the RLC SDU,
   wherein the delivered PDCP SDU is a complete PDCP SDU that is obtained by performing deciphering and header decompression on the PDCP PDU successfully received from the RLC layer before the PDCP radio bearer release request and previously stored one or more PDCP PDUs in a PDCP reception buffer; and
   release a PDCP entity after the complete PDCP SDU is delivered to a higher layer.

* * * * *